United States Patent [19]

Siepmann

[11] 4,135,222
[45] Jan. 16, 1979

[54] FAULT CURRENT PROTECTION SWITCH

[75] Inventor: Bernd J. Siepmann, Geretsried, Germany

[73] Assignee: Siemens Aktiengesellschaft, Berlin & Munich, Germany

[21] Appl. No.: 760,974

[22] Filed: Jan. 21, 1977

[30] Foreign Application Priority Data

Jan. 23, 1976 [DE] Fed. Rep. of Germany ....... 2602534

[51] Int. Cl.² .............................................. H02H 3/28
[52] U.S. Cl. ........................................ 361/44; 361/45; 361/46
[58] Field of Search ........................ 361/42, 44, 45, 46; 363/86, 87, 89, 126, 129

[56] References Cited

U.S. PATENT DOCUMENTS

| 2,984,779 | 5/1961 | Klees | 363/126 X |
| 3,671,809 | 6/1972 | Ryan et al. | 361/45 |
| 3,742,306 | 6/1973 | Cohen et al. | 361/45 |

FOREIGN PATENT DOCUMENTS 44-51  2/1969  Japan ......................................... 363/126

Primary Examiner—Harry E. Moose, Jr.
Attorney, Agent, or Firm—Hill, Gross, Simpson, Van Santen, Steadman, Chiara & Simpson

[57] ABSTRACT

A fault current protection switch detects fault currents from conductors of a supply means to ground. The system uses at least one difference transformer connected to the conductors of the supply mains. An oscillation generator circuit is connected to the difference transformer through feedback windings. The oscillation generator circuit checks the magnetization of a core of the difference transformer, and, in the event of a change in the transforming properties of the core due to "mis" magnetization caused by a fault current, the oscillation generator circuit triggers a control and switching member connected in the supply mains to disconnect the same.

12 Claims, 6 Drawing Figures

FAULT CURRENT PROTECTION SWITCH

BACKGROUND OF THE INVENTION

1. Field of the Invention

The invention relates to a fault current protection switch with windings of at least one difference transformer connected into each path of the supply mains. The transformer operates by difference measurement to detect any fault current to ground and switching off the supply mains via control and switching apparatus.

2. Description of the Prior Art

Generally speaking, in currently available electrical equipment any exposed metal parts are grounded in order to avoid the occurrence of voltages therein which may result through insulation damage and which may be dangerous to bodily contact. Since the protective ground connections can be broken by error, fault current protection switches are provided. When fault currents occur of a given magnitude to ground, these switches disconnect the supply voltage. They are designed to be sensitive and respond rapidly to ensure that when a faulty device is grounded via a human being no currents dangerous to the human body can occur.

Previously known fault current protection switches operate with a difference transformer in which all the measuring windings for the various conductors of the supply mains are connected such that their currents normally cancel one another out. As a result, a trip coil of the fault current protection switch normally has no current flow therethrough and does not allow the protection switch to respond. Fault currents, on the other hand, disturb this equilibrium in the measuring windings and induce a voltage in the trip winding and thus cause the protection switch to respond. In the present state of the art high-grade transformers can possibly be used to reduce the trip current to approximately 30 milliamperes, although this does not entirely rule out the danger to humans as a result of bodily contact currents.

In addition, even in these high-grade transformers their transmission properties are impaired by a d.c. component of the fault current. For such currents they become less sensitive or, in the case of a very high d.c. component, they may no longer respond at all. More recent developments in electrical technology have resulted in an increasing use, even in normal electrical devices, of semiconductors which can draw fault currents with high d.c. components. In all these situations it is almost impossible to use the previously known fault current protection switches.

SUMMARY OF THE INVENTION

An object of this invention is to avoid the disadvantages of the known fault current protection switches by providing switch systems which, even in the case of currents which would be harmless to the body, respond rapidly and which are not rendered inactive by a high d.c. component. In accordance with the invention this is achieved in a fault current protection switch system with a difference transformer which uses an oscillation generator to check on the magnetization of the core of the transformer. In the event of a change in the transformation properties of the core as a result of a "mis" magnetization by a fault current, the oscillation generator triggers control and switching means preferably by altering oscillation generator internal impedance. It is also advantageous to use the discontinuation of the generator oscillations as a triggering criterion for the control and switching means. It is furthermore advantageous to stabilize the operating d.c. voltage of the protection switch by means of a voltage norm preferably produced by a Zener diode in combination with a transistor, in such manner that operation is possible at a lower danger voltage. In Germany, for example, this amounts to approximately 70 V. Advantageously, the protection switch can utilize two transformers, the measuring windings of which are wired in the same manner in the paths of the supply mains, and whose interrogation windings for the oscillation generator are wired in opposition. This serves to prevent oscillations of the oscillation generator from being transmitted by the fault current protection switch into the mains as an interference voltage.

The oscillation generator has a higher operating frequency than a frequency of the supply means.

DESCRIPTION OF THE PREFERRED EMBODIMENTS

Figure 1:
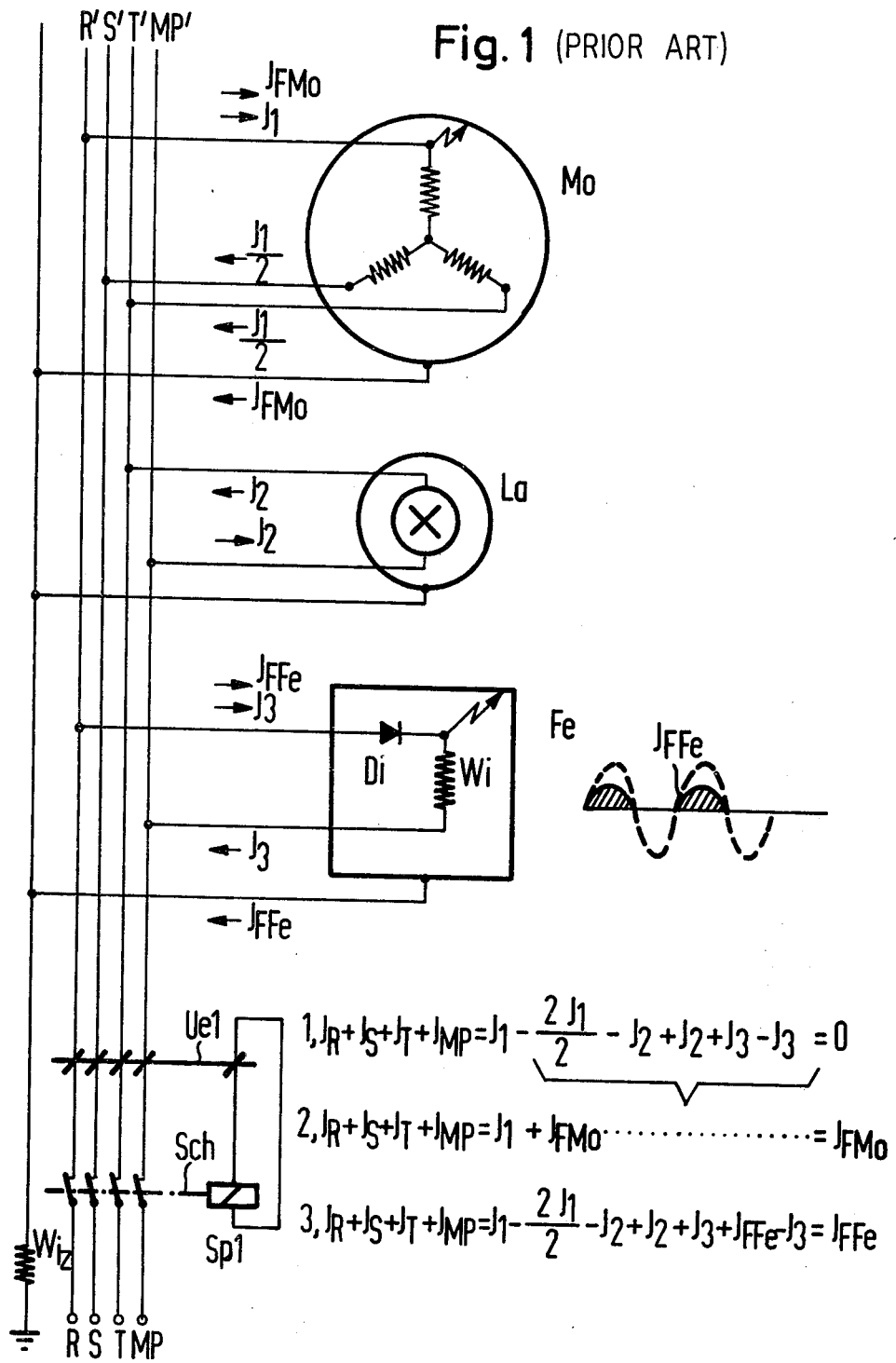
FIG. 1 illustrates a three-phase mains in operation having possible fault currents to ground, and a known fault current protection switch.

Three devices, namely a motor Mo, a lamp La and a television apparatus Fe are connected as shown in FIG. 1 to the three-phase mains R', S', T', MP'. Their housings are grounded by protection lines via a minimum permissible resistance $Wi_z$. The known excess current switch consists of a transformer Ue1, the control coil Sp1 and the switch Sch by which the devices can be cut off from the three phase mains R, S, T, MP. The individual switching elements of the switch Sch must be manually inserted against the force of a spring in order to switch on the circuits, and are then held by a locking lever. In response to the fault current protection switch this locking lever can itself be released by the control coil Sp1 and thus the switch Sch can be abruptly opened. First the three devices, namely the motor Mo, the lamp La, and the television device Fe are to be considered without any fault currents.

In the individual lines there flows only the currents $J_1$ to $J_3$ which, as can be seen from equation (1), cancel one another at every instant and which therefore do not produce any effects in the transformer Ue1. By way of example, the time at which the motor current of the phase in line R is a maximum has been considered. If, on the other hand the fault curret $J_{FMo}$ indicated by a zig-zag line occurs in the motor Mo, this fault current also appears in the transformer Ue1, as can be seen from equation (2). This current $J_{FMo}$ acts upon the control Sp1 which, with appropriate dimensioning, causes the fault current protection switch to respond. If, on the other hand, a fault current $J_{FFe}$ occurs in the television apparatus Fe, the crystal diode Di, as a result of halfwave operation, produces a d.c. magnetization of the transformer Ue1 which the latter is unable to transmit. See Equation (3). Inspite of a considerable fault current, the fault current protection switch does not respond reliably in this case.

Figure 2:
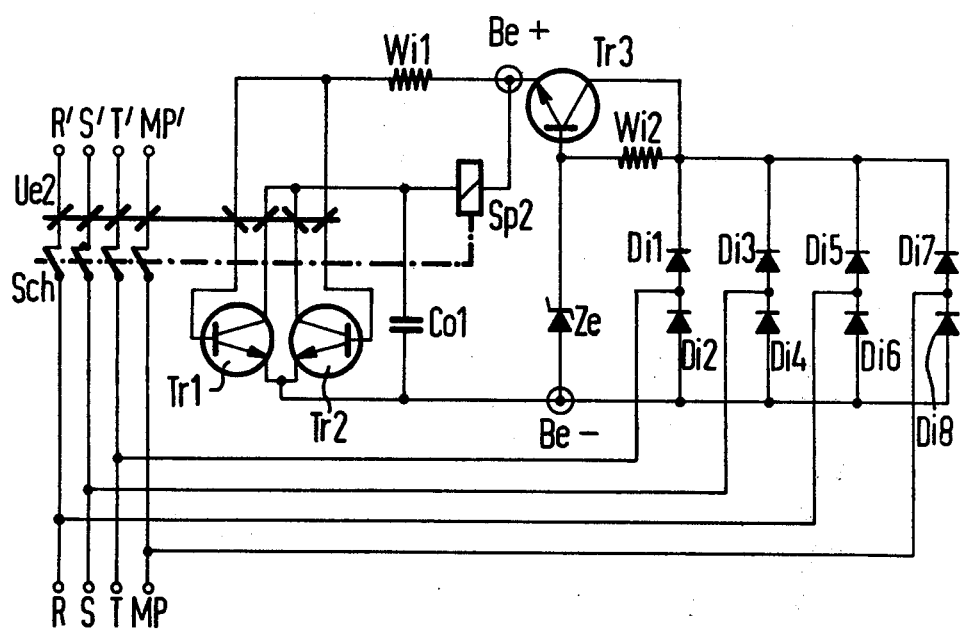
FIG. 2 illustrates a fault current protection switch of this invention with an oscillation generator.

In FIG. 2 the collector and base lines of the transistors Tr1, Tr2 are connected across the windings of the transformer Ue2. Thus the base lines are connected via the resistor Wi1 and the collector lines via the control coil Sp2 to the operating voltage Be (+) and the capacitor Co1 is located between the collector terminals and the operating voltage Be (−). As long as the transistors Tr1, Tr2 which are fed-back via the transformer Ue2 produce rectangular oscillations as an astable or free running trigger stage, their impedance is sufficient to prevent the control coil Sp2 from being operative. If, on the other hand, the core of the transformer Ue2 is magnetized by a fault current, the astable trigger stage Tr1, Tr2 ceases oscillation and causes the switch Sch to respond via the control coil Sp2. To prevent the operating voltage Be from failing even in the breakdown of a phase, it is produced via crystal diodes Di1 to Di8 provided in a rectifier Graetz circuit, two of the diodes being connected to each of the phases R, S, T, MP in parallel. The Zener diode Ze in combination with the resistor Wi2 and the transistor Tr3 serves to voltage-stabilize the operating voltage Be at a value of approximately 70 V. This value corresponds to the permissible danger voltage in Germany of approximately 70 V peak. The control coil can be used selectively as either a make-current or break-current trip coil.

Figure 3:
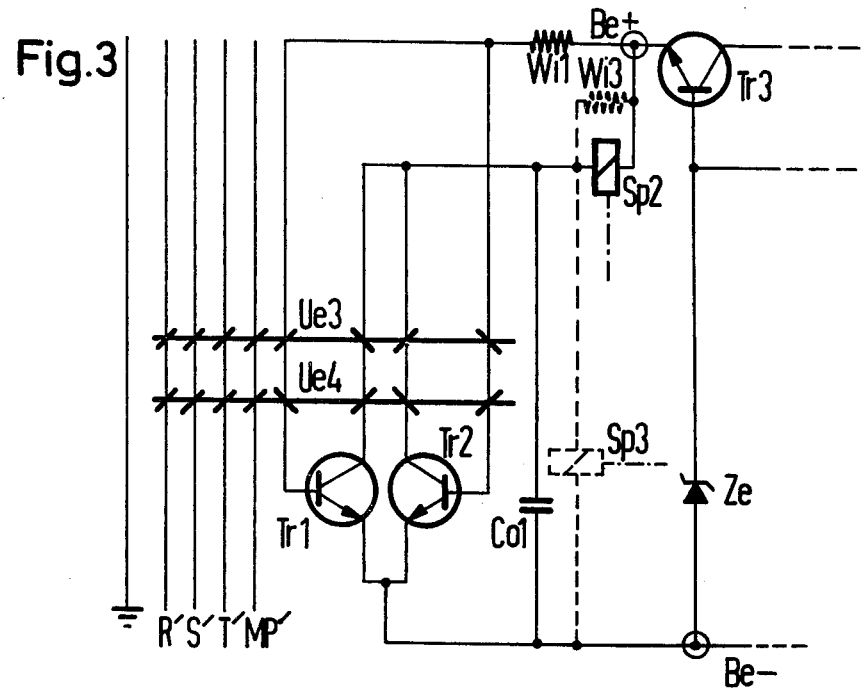
FIG. 3 illustrates a fault current protection switch of this invention utilizing two transformers.
Figure 4:
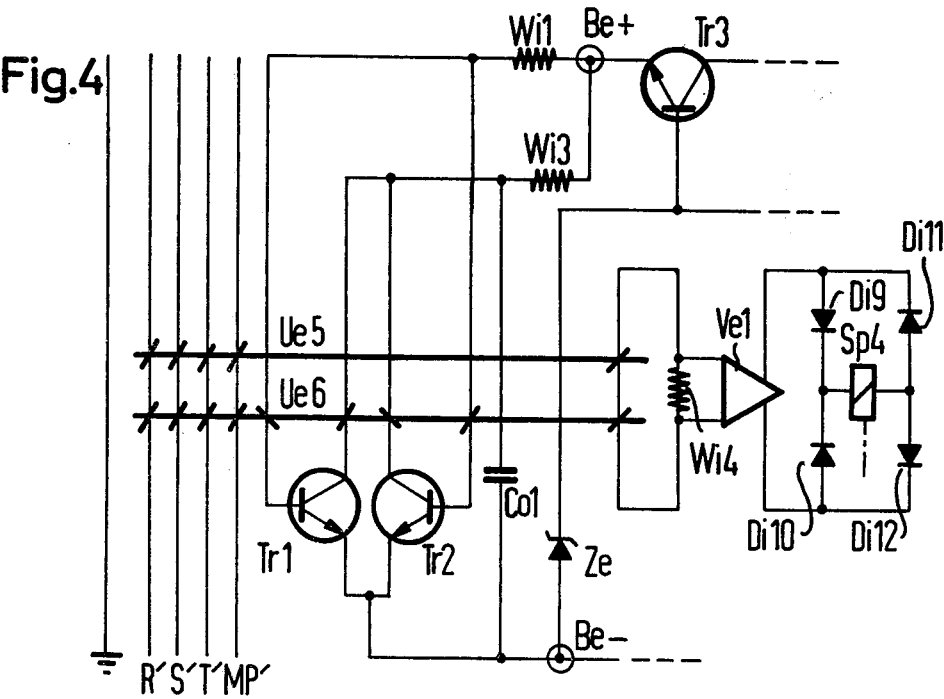
FIG. 4 illustrates a fault current protection switch of this invention having two intercoupled transformers.
Figure 5:
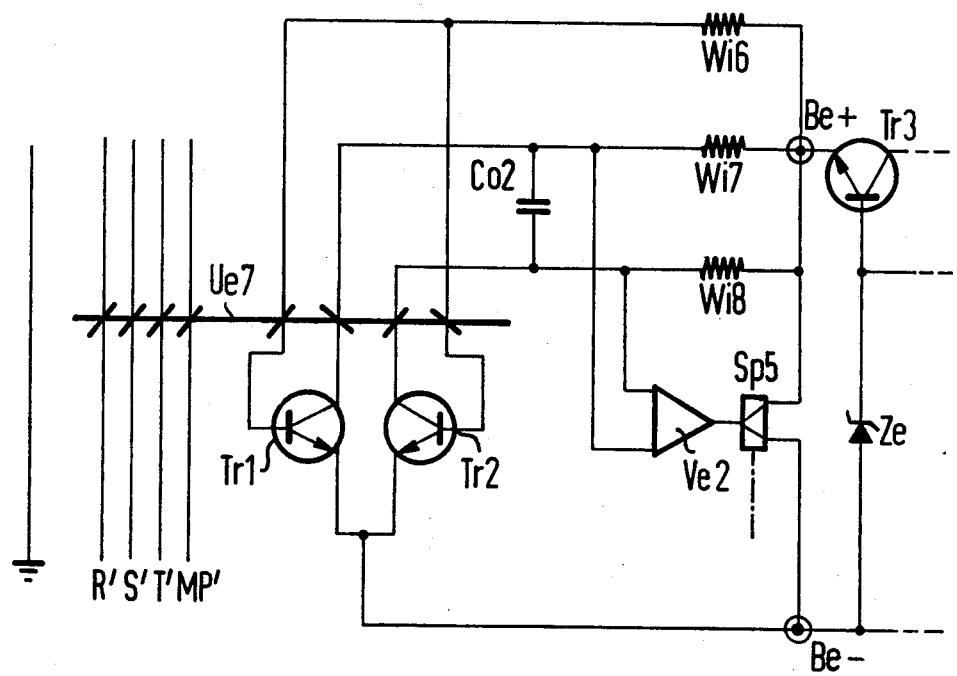
FIG. 5 illustrates a fault current protection switch of this invention with difference current measurement at the oscillation generator.

In FIG. 3 the right-hand portion of the circuit which is required for the production of the operating voltage Be has been omitted, as this has not been changed in this figure or in FIGS. 4 and 5. Instead of the transformer Ue2 of FIG. 2, two transformers Ue3, Ue4 are provided in FIG. 3 which are connected in like direction through measuring windings in the individual paths of the mains. On the other hand, the windings of the transistors Tr1, Tr2 have been connected in opposition to one another in such a way that the rectangular oscillation of the astable trigger stage cannot be fed as an interference voltage into the mains. Instead of arranging the coil Sp2 in series with the astable trigger stage Tr1, Tr2, the resistor We3 and the coil Sp3, likewise shown in broken lines, can be provided. The latter is arranged in parallel to the astable trigger stage, so that normally it is energized by a voltage and only on the discontinuation of the oscillations is it no longer sufficiently excited. Thus, in this case the switch Sch of the fault current protection switch is triggered, not by the make current, but by the break current. Consequently, the fault current protection switch can simultaneously carry out a check on the mains voltage. In this arrangement it is possible to dispense with a stabilization of the operating voltage Be as considerable voltage differences are in fact advantageous.

In FIG. 4, the transistors Tr1, Tr2 are preceded by the two resistors Wi1, Wi3. Also the two transformers Ue5, Ue6 are coupled to one another in each case via a winding and the resistor Wi4 is connected into this coupling circuit. Current changes in this coupling circuit act via an amplifier Ve1 and the crystal diode bridge Di9 to Di12 upon the control coil Sp4 which itself triggers the switch Sch of the fault current protection switch.

In FIG. 5 only one transformer Ue7 is provided and here by means of the resistors Wi6 to Wi8, the difference between the collector currents of the transistors Tr1, Tr2 as amplified by the amplifier Ve2 is used to control the coil Sp5.

Figure 6:
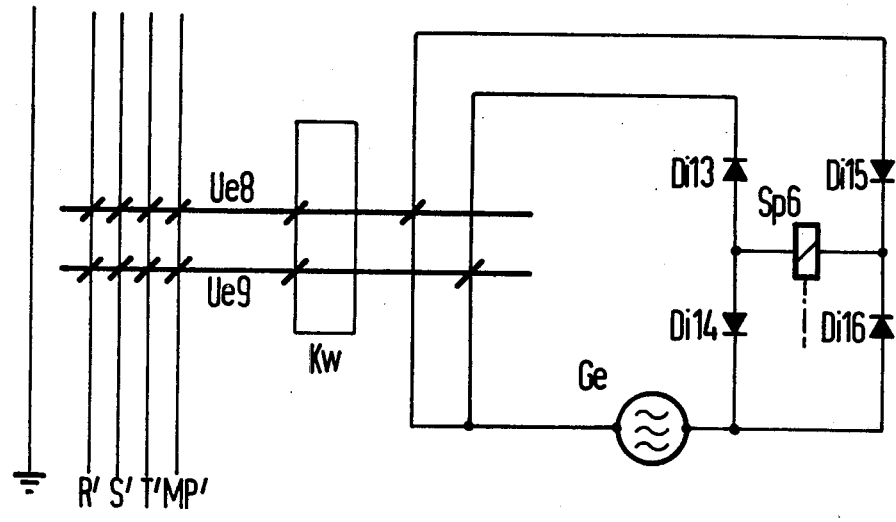
FIG. 6 illustrates a fault current protection switch of this invention which operates in accordance with the principles of a magnetic amplifier.

In FIG. 6 the transformers Ue8, Ue9 are likewise coupled by the line Kw. The generator Ge controls the coil Sp6 via the crystal diode bridge Di13 to Di16 in accordance with the principle of a magnetic amplifier. In the rest state, without fault currents, both windings Ue8 and Ue9 act as choke coils which hardly allow through a current. In the case of a fault current the bias magnetization of one of the transformers Ue8, Ue9 causes a shift in this equilibrium, so that a current in one direction sharply rises and causes the control coil Sp6 to respond.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A fault current protection switch system comprising:
   (a) a multi-path supply mains;
   (b) a ground;
   (c) a difference transformer means connected to each path of the supply means for detecting fault currents to ground;
   (d) control and switching means for disconnecting the supply mains; and
   (e) oscillation generator means connected to the difference transformer means and also to the control and switching means for checking the magnetization of a core of the difference transformer means, and, in the event of a change in the transforming properties of the core due to "mis"-magnetization by a fault current, said oscillation generator means triggers the control and switching means by a change of internal resistance to disconnect the supply mains by a change in the oscillation generator internal impedance, said oscillation generator means having a higher operating frequency than a frequency of the supply mains.

2. A protection switch system as claimed in claim 1, characterized in that said oscillation generator means comprises a back-coupled amplifier means having as back-coupling windings interrogation winding means of said difference transformer means, said interrogation winding means detecting a fault magnetization of the transformer means and causing an alteration of an internal resistance of the oscillator generator means which triggers the control and switching means.

3. A protection switch system as claimed in claim 1, characterized in that said multipath supply mains comprises three phase-conductors and a neutral conductor and an operating d.c. voltage for the system is provided by first and second diodes connected to each phase-conductor and the neutral conductor, said first diodes being commonly connected and said second diodes being commonly connected.

4. A protection switch system as claimed in claim 1, characterized in that said difference transformer means comprises two transformers whose windings in the paths of the supply mains are wound in like directions, both said transformers having interrogation windings for the oscillation generator means.

5. The system of claim 4 in which said interrogation windings of one transformer as compared with interrogation windings of the other transformer are wound oppositely.

6. A fault current protection switch system comprising:
(a) a multi-path supply mains;
(b) a ground;
(c) a difference transformer means connected to each path of the supply means for detecting fault currents to ground;
(d) control and switching means for disconnecting the supply mains; and
(e) oscillation generator means connected to the difference transformer means for checking the magnetization of a core of the difference transformer means, and, in the event of a change in the transforming properties of the core due to "mis"-magnetization by a fault current, said oscillation generator means triggers the control and switching means to disconnect the supply mains by a change in the oscillation generator internal impedance, said oscillation generator means discontinuing oscillations in order to trigger the control and switching means.

7. A fault current protection switch system comprising:
(a) a multi-path supply mains;
(b) a ground;
(c) a difference transformer means connected to each path of the supply means for detecting fault currents to ground;
(d) control and switching means for disconnecting the supply mains;
(e) oscillation generator means connected to the difference transformer means for checking the magnetization of a core of the difference transformer means, and, in the event of a change in the transforming properties of the core due to "mis"-magnetization by a fault current, said oscillation generator means triggers the control and switching means to disconnect the supply mains by a change in the oscillation generator internal impedance;
(f) said difference transformer means comprising two transformers whose windings in the paths of the supply mains are wound in like directions, both said transformers having interrogation windings for the oscillation generator means; and
(g) transistors being provided in said oscillation generator means and that said interrogation windings are provided in the base and collector circuits of said transistors and that the windings provided in the base circuits of said transistors (serving as feedback windings) are wound only on one of said two transformers.

8. A fault current protection switch system comprising:
(a) a multi-path supply mains;
(b) a ground;
(c) a difference transformer means connected to each path of the supply means for detecting fault currents to ground;
(d) control and switching means for disconnecting the supply mains;
(e) oscillation generator means connected to the difference transformer means for checking the magnetization of a core of the difference transformer means, and, in the event of a change in the transforming properties of the core due to "mis"-magnetization by a fault current, said oscillation generator means triggers the control and switching means to disconnect the supply mains by a change in the oscillation generator internal impedance;
(f) said difference transformer means comprising two transformers whose windings in the paths of the supply mains are wound in like directions, both said transformers having interrogation windings for the oscillation generator means; and
(g) said two transformers being coupled together by, in each case, one of their windings, and that the interrogation windings of only one transformer are connected to the oscillation generator.

9. A protection switch system as claimed in claim 8, characterized in that an amplifier means is provided for using the current in said coupled together windings as a trip criterion.

10. A fault current protection switch system comprising:
(a) a multi-path supply mains;
(b) a ground;
(c) a difference transformer means connected to each path of the supply means for detecting fault currents to ground;
(d) control and switching means for disconnecting the supply mains;
(e) oscillation generator means connected to the difference transformer means for checking the magnetization of a core of the difference transformer means, and, in the event of a change in the transforming properties of the core due to "mis"-magnetization by a fault current, said oscillation generator means triggers the control and switching means to disconnect the supply mains by a change in the oscillation generator internal impedance; and
(f) transistors being provided in said oscillation generator means, and current measuring means being provided in the collector circuits of the transistors to form a difference current, the latter being used by an amplifier means as a trip criterion.

11. A fault current protection switch system comprising:
(a) a multi-path supply mains;
(b) a ground;
(c) a difference transformer means connected to each path of the supply means for detecting fault currents to ground;
(d) control and switching means for disconnecting the supply mains; and
(e) oscillation generator means connected to the difference transformer means for checking the magnetization of a core of the difference transformer means, and, in the event of a change in the transforming properties of the core due to "mis"-magnetization by a fault current said oscillation generator means triggers the control and switching means to disconnect the supply mains by a change in the oscillation generator internal impedance; and
(f) the difference transformer means comprising two transformers with measuring windings in paths of the supply mains, both transformers being coupled together by, in each case, one of their windings, and that the oscillation generator means operates in combination with at least two crystal diodes connected to said control and switching means and said two transformers, said combination operating as a magnetic amplifier which triggers said control and switching means.

12. A fault current protection switch system for detecting low fault currents and fault currents with a d.c. component, comprising:
(a) a supply mains having at least two lines;
(b) a ground;
(c) a difference transformer means having a current sensing winding connected in each of said lines, said transformer means also having oscillation feedback windings;
(d) power supply means;
(e) switching means in said supply mains; and
(f) oscillation generator means connected to said difference transformer means through said oscillation feedback windings, said oscillation generator means checking a core magnetization of the difference transformer means, and, in response to a change in the transforming properties of the transformer means caused by a fault current to ground in one of the supply mains lines, said oscillation means triggers the switching means to disconnect said supply mains, and said oscillation generator means comprising two transistors, said oscillation feedback windings comprising at least four windings, a winding being connected to a base of each transistor and a collector of each transistor.

* * * * *